June 19, 1934. C. F. PETZINGER 1,963,803
REAMER PILOT
Filed Sept. 22, 1932
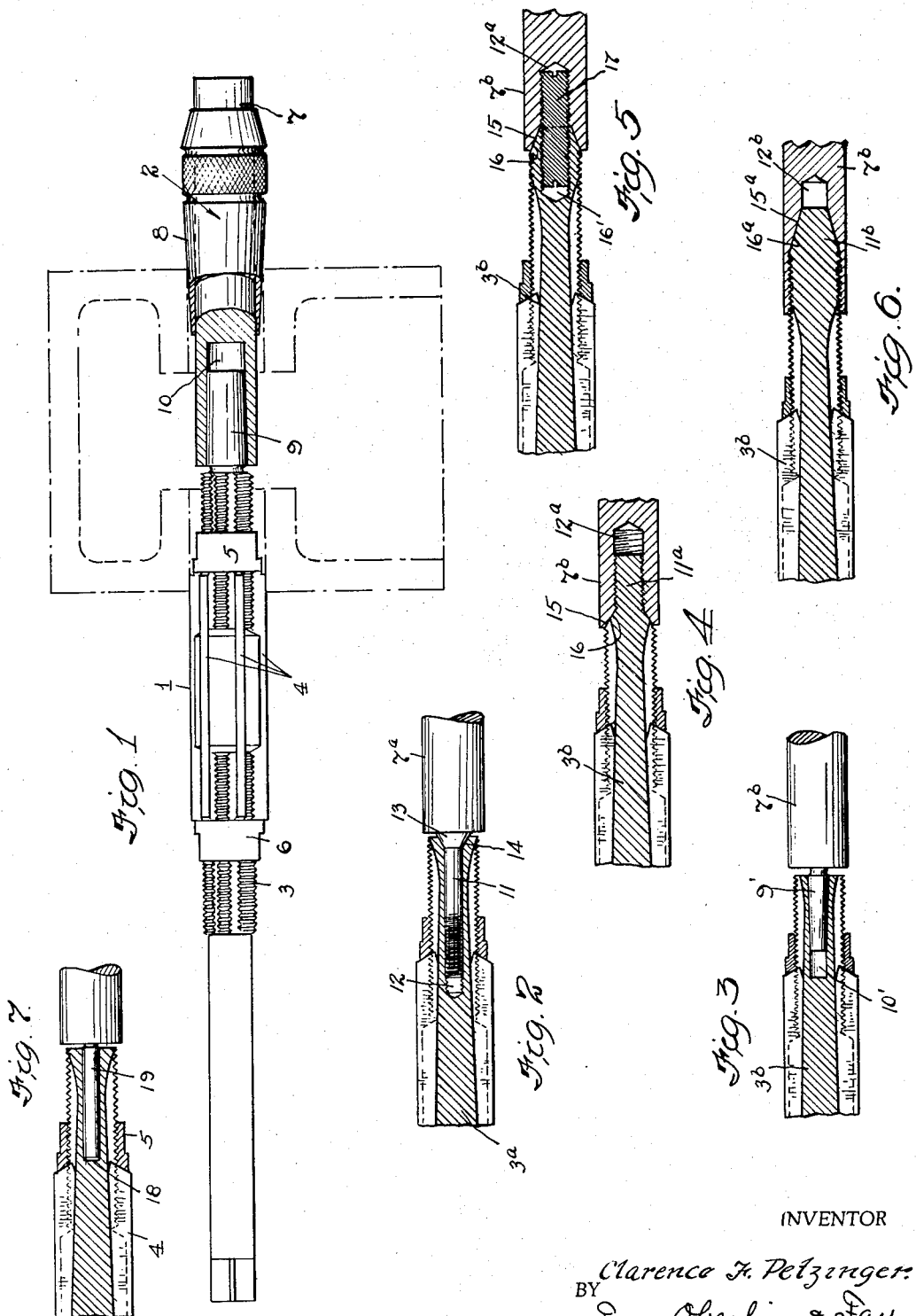
INVENTOR
*Clarence F. Petzinger*
BY *Fay, Oberlin & Fay*
ATTORNEYS Patented June 19, 1934

1,963,803

UNITED STATES PATENT OFFICE 1,963,803

REAMER PILOT

Clarence F. Petzinger, Cleveland, Ohio, assignor to The Cleveland Twist Drill Company, Cleveland, Ohio, a corporation of Ohio Application September 22, 1932, Serial No. 634,344

2 Claims. (Cl. 77—72)

This invention relates as indicated to rotary cutting tools and more especially to such tools comprising separable cutting or operating and guiding portions.

This invention is particularly adapted to reamers designed for so-called line reaming operations where two spaced axially aligned holes, such as occur in internal combustion engine pistons, are to be reamed to insure that both holes are of the correct diameters and in correct axial alignment for the reception of the wrist pins. The invention presently to be described has been illustrated as relating to the type of tool commonly referred to as a Critchley reamer, although it is to be understood that the principles of this invention may be applied to rotary cutting tools generally wherein two separable parts are required to be maintained in accurate axial alignment.

As is well known to those familiar with the art, the Critchley type of reamer comprises a body portion threaded for a substantial portion of its length and provided with tapered axially extending slots or grooves, wherein are positioned movable blades maintained in adjustable position relatively to the body of the tool by axially spaced nuts engaging the opposite ends of such blades.

While line reaming spaced holes in axial alignment, it is of the utmost importance that both holes be not only of exactly the correct size but that cylindrical surfaces formed by the reamer in passing through the holes be in exact alignment. Reamers of the Critchley type have usually been provided with extensions commonly referred to as pilots, for the purpose of maintaining the axis of the reamer in proper alignment with respect to the axes of both holes during the time when the first hole is being reamed.

Pilots associated with this and other types of reamers may be generally classified into two groups, i. e., those which are formed integrally with the body of the reamer and are in effect an axial projection of the solid portion thereof and those which are separable from such body portion. The disadvantages of the types of construction in which the pilot is formed integrally with the body of the reamer are well known to those familiar with the art and have led to a line of development characterized by having the pilot separable from the body of the reamer.

In the type of construction above referred to as characterized by having the reamer and pilot separable, it has been the universal practice in the prior art to join such portions by means of a threaded joint. Considerable difficulty is experienced, however, in threadably coupling two cylindrical bodies and when so coupled, insuring that the two parts will be in exact axial alignment for the reason that it is almost impossible to cut threads with sufficient accuracy to insure that the two parts, when screwed together, will not seat with the axes thereof out of axial alignment. It has been suggested in the prior art to screw the pilot onto a threaded end of the reamer until the end of the pilot seats against the front nut employed as a means for securing the front ends of the cutting blades. This seating of the pilot against the blade-retaining nut, however, introduces numerous variables into the connection which make it almost impossible to maintain the two parts in axial alignment for the reason that the nut, of necessity, must occupy different relative axial and circumferential positions with respect to the threaded shank of the reamer and consequently, for each such relative position, the threads as well as the surface of the nut against which the pilot is forced, may throw the pilot out of axial alignment with the reamer.

It is one of the objects of this invention to provide a rotary cutting tool comprising separable portions with close fitting finished complementary surfaces formed on the bodies of such portions, whereby, when such finished surfaces are brought into engagement, regardless of the circumferential relationship between the parts joined, such parts will always be in axial alignment. Other objects of this invention will appear as the description proceeds.

To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Figure 1 is a side elevational view, partially in section, of a reamer constructed in accordance with the principles of this invention and shown positioned in the wrist pin holes of a piston; Figures 2 to 7, both inclusive, are fragmentary side elevational views, partially in section, of several modifications of the specific means whereby the two parts may be joined for perfect axial alignment.

Referring now more specifically to the drawing and more especially to Figure 1, the tool herein illustrated is, as previously indicated, of the Critchley type, i. e., the cutting portion 1 thereof which has the pilot portion, generally indicated at 2, associated therewith, comprises a threaded body portion 3 on which are positioned the usual movable blades 4 held in position by nuts 5 and 6, the former being adjacent the forward end of the tool.

The pilot 2 constructed in accordance with the principles of my invention comprises a cylindrical body portion 7 adapted to be connected, in the manner hereinafter more fully explained, to the forward end of the cutting portion of the tool and slidably mounted in close fitting engagement thereon is a tapered sleeve, generally indicated at 8, adapted to be inserted in the wrist pin hole in the piston opposite to that in which the reaming operation is initiated. The tapered or coniform outer surface of the sleeve 8 enables one side of body portion 7 to be employed in the reaming of holes of a substantially wide range of sizes.

The connection between the pilot or guiding portion and reaming or cutting portion of the tool is illustrated in Figure 1 as comprising a tapered projection 9 formed integrally with and extending axially from the forward end of the body portion of the reamer and extending into a complementary aperture indicated at 10 formed in the adjacent terminal of the pilot body 7. The outer periphery of the projection 9 and the inner periphery of the receiving aperture 10 are, as previously indicated, tapered slightly and finished to a close fit, so that when the parts are positioned as illustrated in Figure 1, the two portions of the tool will be maintained thereby in exact axial alignment.

After the parts have been joined in the manner illustrated in Figure 1 and the reaming operation performed, the tightness of the fit of the projection 9 in the aperture 10 may necessitate the employment of appreciable force in order to separate the portions of the tool. Such separating force may be secured in a tool constructed in accordance with the principles of this invention by unscrewing the nut 5, i. e., threading the same axially along the body 3 of the cutting portion until the forward face of the nut engages the adjacent terminal of the pilot 7, whereon sufficient pressure will be brought to bear to force the two parts axially apart. After the parts have been so separated, the nut may be returned to its position in engagement with the forward ends of the movable blades without disturbing the set of the reamer for the reason that the rear nut 6 need not be disturbed during such separating operation.

In Figure 3 is illustrated a slight modification of the structure illustrated and described in Figure 1, in that as illustrated in Figure 3, the body portion 3 of the cutting part of the tool is provided with an aperture 10' and the adjacent terminal of the pilot or guiding portion is provided with a projection 9', such projection and aperture being complementally tapered and finished to a close fit so that when the parts are brought into engagement, as illustrated in Figure 3, the cutting and guiding portions of the tool will be supported and maintained in exact axial alignment.

For some uses, it may be desirable to insure against relative axial displacement of the cutting and guiding portions of the tool during the reaming operation, which might occur if the friction of close fitting finished surfaces only is relied upon. To this end, the projection on one part of the tool and the complementary recess in the other part of the tool may respectively be provided with threaded engaging portions, as illustrated in Figures 2, 4, 5 and 6.

In Figure 2, the pilot 7a is provided with an axially projecting stem 11 which extends into an aperture 12 formed axially in the body 3a of the cutting portion of the tool and such aperture and projection provided with complementary threads, whereby a threaded connection may be established between the cutting and guiding portions. In the modification illustrated in Figure 2, however, the threaded connection between the two parts is employed simply for the purpose of preventing relative axial displacement and the two parts are maintained in true axial alignment by complementary, close-fitting, tapered finished seats 13 and 14, respectively formed on the projection 11 and around the opening of the aperture 12. In the modification illustrated in Figure 2, regardless of any inaccuracies which may occur in the threaded connection, the carefully finished close-fitting, tapered surfaces 13 and 14 insure that the cutting and guiding portions of the tool will be maintained in axial alignment. The modification illustrated in Figure 4 is substantially a reversal of the arrangement illustrated in Figure 2, i. e., the male threaded projection 11a extending into the threaded aperture 12a is formed as a projection integrally with the body 3b of the cutting portion of the tool. The threaded aperture 12a in this case is formed in the terminal of the pilot member 7b. Here again, the two parts of the tool are maintained in accurate axial alignment by the provision of complementary close-fitting, tapered finished seats 15 and 16, respectively formed on the bodies 7b and 11a.

Instead of having the threaded projection 11a as illustrated in Figure 4, integral with the body 3b of the cutting portion of the tool, it may, for facility in manufacture, be advisable to provide, as shown in Fig. 5, a tapped hole 16 in the end of the cutting portion of the tool in which is inserted a threaded stud 17, such stud then being screwed into the threaded aperture 12a in the end of the pilot 7b. Otherwise the modification illustrated in Figure 5 is identical with that illustrated in Figure 4 and hence, like reference characters will be employed to designate the like parts.

A further modification is illustrated in Figure 6 in which the form illustrated in Figure 4 is departed from to the extent that the complementary tapered finished surfaces 15a and 16a are respectively formed adjacent the bottom of the aperture 12b and the terminal of the threaded projection 11b. In this modification, the threaded engagement between the two parts is relied upon simply to force the finished complementary seats into engagement and such seats then insure accurate axial alignment between the parts. In all other respects the tool illustrated in Figure 6 is identical with that described in the previous figures and accordingly, like reference characters will be employed to designate like parts.

Instead of having the seats formed on the two bodies, which insure axial alignment between the parts, tapered as indicated in the description of the previous figures, it may be possible for certain forms of construction to have such seats truly cylindrical in form. A construction illustrating this modification is found in Figure 7 in which the aperture 18 formed in the end of the cutting portion body and the projection 19 on the end of the guiding body are truly cylindrical in form and finished to a close running fit whereby, when the parts are positioned as illustrated in Figure 7, the cutting and guiding portion of the tool will be maintained in accurate axial alignment.

It is within the contemplation of my invention to reversely arrange the connection means illustrated in Fig. 7, i. e., the cylindrical projection may be formed as a projection of the cutting portion of the tool and the aperture formed in the pilot part of the tool.

The above described form of tool in which the separable parts are joined in the manner specified has advantages which may be enumerated as follows:

The two mating complementary surfaces, upon which axial alignment of the two parts depends, may be finished with extreme accuracy which cannot be secured by either the threaded connection or any other connection heretofore employed. The axial alignment of the two parts is not disturbed or affected by the movement of the nuts on the cutting portion of the tool in adjusting the movable blades thereon. The two parts, when joined in the manner specified, may be very quickly and easily separated by simply backing off the forward nut, which normally is employed to hold the movable blades in assembled relation on the reamer.

The type of pilot employed as a guiding portion of the tool comprising this invention makes possible the manufacture of such tools with standard dimensions for the connecting parts whereby a ready interchange may be had between different pilots and different reamers. A reamer provided with the above identified type of means for connection to the pilot may be satisfactorily employed without having the pilot attached thereto; that is, separation of the two parts in no way interferes with the function of the cutting part when used alone. The extreme simplicity of construction and mode of manufacture of the connection between the two parts reduces the ultimate cost of the tool and obviates the necessity of maintaining a large stock of expensive parts for different tool sizes.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:

1. An adjustable line reamer comprising separable cutting and guiding portions, said separable portions frictionally secured to each other in end to end relationship and maintained in axial alignment by close fitting complementary tapering finished surfaces respectively formed on the solid bodies of said portions, said tapering surfaces being the only surfaces of engagement between said separable portions, said cutting portion including a plurality of circumferentially spaced longitudinally inclined grooves, blades slidably mounted in said grooves, said cutting portion being provided with threaded sections adjacent the ends of said blades, nuts on said threaded sections engaging said blades for adjusting and supporting the same, one of said threaded portions being arranged whereby its respective nut may engage said guiding portion to force said cutting and guiding portions axially apart.

2. An adjustable line reamer comprising separable cutting and guiding portions, said separable portions frictionally secured to each other in end to end relationship and maintained in axial alignment by close fitting complementary tapering finished surfaces respectively formed on the solid bodies of said portions, said tapering surfaces being the only surfaces of engagement between said separable portions, said cutting portion adjacent said guiding portion having a diameter less than the diameter of said guiding portion, and a tapered sleeve slidably mounted on said guiding portion and adapted to telescope over the adjacent end of said cutting portion.

CLARENCE F. PETZINGER.